US011703017B2

(12) United States Patent
Zhang et al.

(10) Patent No.: US 11,703,017 B2
(45) Date of Patent: Jul. 18, 2023

(54) METHODS AND SYSTEMS FOR REDUCING HYDROCARBON EMISSIONS

(71) Applicant: Ford Global Technologies, LLC, Dearborn, MI (US)

(72) Inventors: Xiaogang Zhang, Novi, MI (US); Daniel Styles, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 43 days.

(21) Appl. No.: 17/445,175

(22) Filed: Aug. 16, 2021

(65) Prior Publication Data

US 2023/0050865 A1 Feb. 16, 2023

(51) Int. Cl.
| F02M 26/05 | (2016.01) |
| F02M 26/14 | (2016.01) |
| F02M 26/43 | (2016.01) |
| F02D 41/00 | (2006.01) |
| F02D 13/02 | (2006.01) |
| F02D 41/02 | (2006.01) |
| F02D 41/06 | (2006.01) |
| F01N 3/20 | (2006.01) |

(52) U.S. Cl.
CPC ........... *F02M 26/05* (2016.02); *F01N 3/2006* (2013.01); *F02D 13/0257* (2013.01); *F02D 41/005* (2013.01); *F02D 41/0007* (2013.01); *F02D 41/0077* (2013.01); *F02D 41/0255* (2013.01); *F02D 41/064* (2013.01); *F02M 26/14* (2016.02); *F02M 26/43* (2016.02); *F02D 2200/0802* (2013.01)

(58) Field of Classification Search
CPC ........ F02M 26/05; F02M 26/14; F02M 26/22; F02M 26/24; F02M 26/27; F01N 3/2006; F02D 41/005; F02D 41/0255
See application file for complete search history.

(56) References Cited

U.S. PATENT DOCUMENTS

| 5,136,842 A | 8/1992 | Achleitner et al. |
| 6,254,078 B1 | 7/2001 | Taruki |
| 9,238,983 B2 | 1/2016 | Zhang et al. |
| 10,393,041 B2 | 8/2019 | Ulrey et al. |
| 10,746,484 B2 | 8/2020 | Zhang |
| 2004/0083716 A1* | 5/2004 | Twigg .................. F01N 3/0835 60/284 |

(Continued)

FOREIGN PATENT DOCUMENTS

| CN | 108798930 A | 11/2018 |
| JP | 4400378 B2 * | 1/2010 |

*Primary Examiner* — Logan M Kraft
*Assistant Examiner* — Anthony L Bacon
(74) *Attorney, Agent, or Firm* — Vincent Mastrogiacomo; McCoy Russell LLP

(57) ABSTRACT

Methods and systems for heating an emission control device are provided. In one example, a method for a vehicle comprises during an engine cold start, heating an emission control device of the engine using a dual heat exchanger to heat secondary air and cool exhaust gas, and further heat secondary air with an electric heater. The method further comprises directing the heated secondary air to each exhaust runner of the engine via individual air injectors to mix with exhaust gas. In this way, an improved mixture of air and exhaust reduces catalyst light-off time and increases conversion efficiency, thereby reducing hydrocarbon emissions during engine cold start.

19 Claims, 7 Drawing Sheets

(56) References Cited

U.S. PATENT DOCUMENTS

| | | | | |
|---|---|---|---|---|
| 2006/0021332 A1* | 2/2006 | Gaiser | F01N 5/02 | |
| | | | | 60/297 |
| 2007/0089400 A1* | 4/2007 | Huang | F01N 3/00 | |
| | | | | 60/284 |
| 2011/0072788 A1* | 3/2011 | Ruona | F02M 26/05 | |
| | | | | 60/287 |
| 2014/0109554 A1* | 4/2014 | Balthes | F01N 13/009 | |
| | | | | 60/274 |
| 2014/0196454 A1* | 7/2014 | Ulrey | F02M 26/07 | |
| | | | | 60/274 |
| 2015/0369101 A1* | 12/2015 | Leone | F02D 41/064 | |
| | | | | 123/406.12 |
| 2016/0348615 A1* | 12/2016 | Fischer | F02M 35/02 | |
| 2017/0335748 A1* | 11/2017 | Zhang | F02D 41/0065 | |
| 2018/0171907 A1* | 6/2018 | Ulrey | F02M 26/14 | |

* cited by examiner

US 11,703,017 B2

METHODS AND SYSTEMS FOR REDUCING HYDROCARBON EMISSIONS

FIELD

The present description relates generally to methods and systems for reducing hydrocarbon emissions from an internal combustion engine by utilizing secondary air injection.

BACKGROUND/SUMMARY

More than one-third of a vehicle's hydrocarbon emissions can occur during and right after cold start. Close coupled catalytic converters may be used to reduce emissions by reducing the time necessary to reach catalyst light-off temperature. However, during peak load/power conditions where exhaust temperatures can exceed 800 C, both conversion efficiency and catalyst durability may be compromised.

One approach for rapidly raising the temperature of an emission control device of an engine is described in U.S. Pat. No. 5,136,842. Therein, the engine is operated with a rich air-fuel ratio and secondary air is directly introduced into an exhaust upstream of the emission control device. In this system, the excess fuel from the engine is expelled into the exhaust, where it reacts with the secondary air upstream of the emission control device. The reacted fuel increases the temperature of the exhaust, thus heating the emission control device. However, in order to introduce the secondary air into the exhaust, a secondary air pump is used to increase the pressure of the secondary air above the exhaust pressure. Use of such a pump may degrade fuel efficiency and require additional packaging space, thus reducing the efficiency of the engine. Additionally, this system may not contribute to reducing exhaust peak temperatures during high load conditions, thus adversely affecting catalyst durability.

The inventors herein have recognized the issues with the above approach and offer a method and a system to at least partly address them. In one embodiment of the present disclosure, a method for a vehicle comprises during an engine cold start, heating an emission control device of the engine using a dual heat exchanger to heat secondary air and cool exhaust gas, and further heat secondary air with an electric heater. The method further comprises directing the heated secondary air to each exhaust runner of the engine via individual air injectors to mix with exhaust gas.

As another example, the issues described above may be addressed by a system for a vehicle, comprising an engine having a secondary air injection passage and an EGR passage; a dual heat exchanger coupled to the secondary air injection passage and the EGR passage; an electric heater coupled to the secondary air injection passage downstream of the dual heat exchanger; and a controller storing instructions for: responsive to a cold start of the engine, heating an emission control device of the engine using the dual heat exchanger to heat secondary air and cool exhaust gas, and further heat secondary air with the electric heater.

In this way, exhaust gas and secondary air may be routed through a dual heat exchanger, where the dual heat exchanger may cool the exhaust gas and heat the secondary air flow. The exhaust gas is routed through an EGR cooler to an intake passage and the secondary air is further heated through an electric heater based upon an exhaust temperature sensor input. The secondary air is injected into each exhaust runner based upon a timing of the exhaust blowdown pulses from the respective cylinders. The increased temperature of secondary air and improved mixture of air and exhaust reduces catalyst light-off time during cold start, and non-heated air during high load conditions reduces exhaust peak temperature which ultimately improves conversion efficiency while reducing catalyst degradation.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
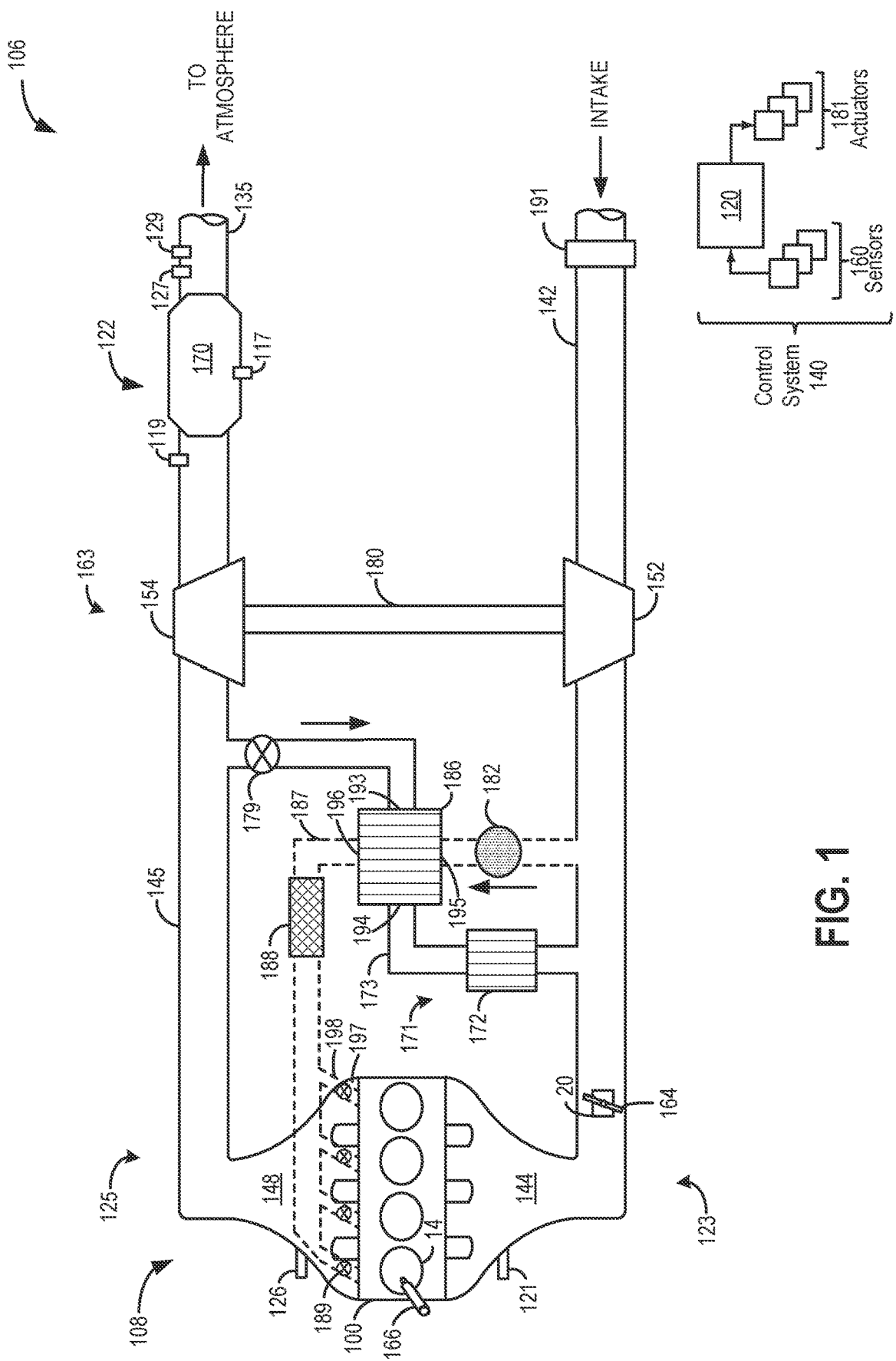
FIG. 1 shows a schematic depiction of an engine of a vehicle system.
Figure 2:
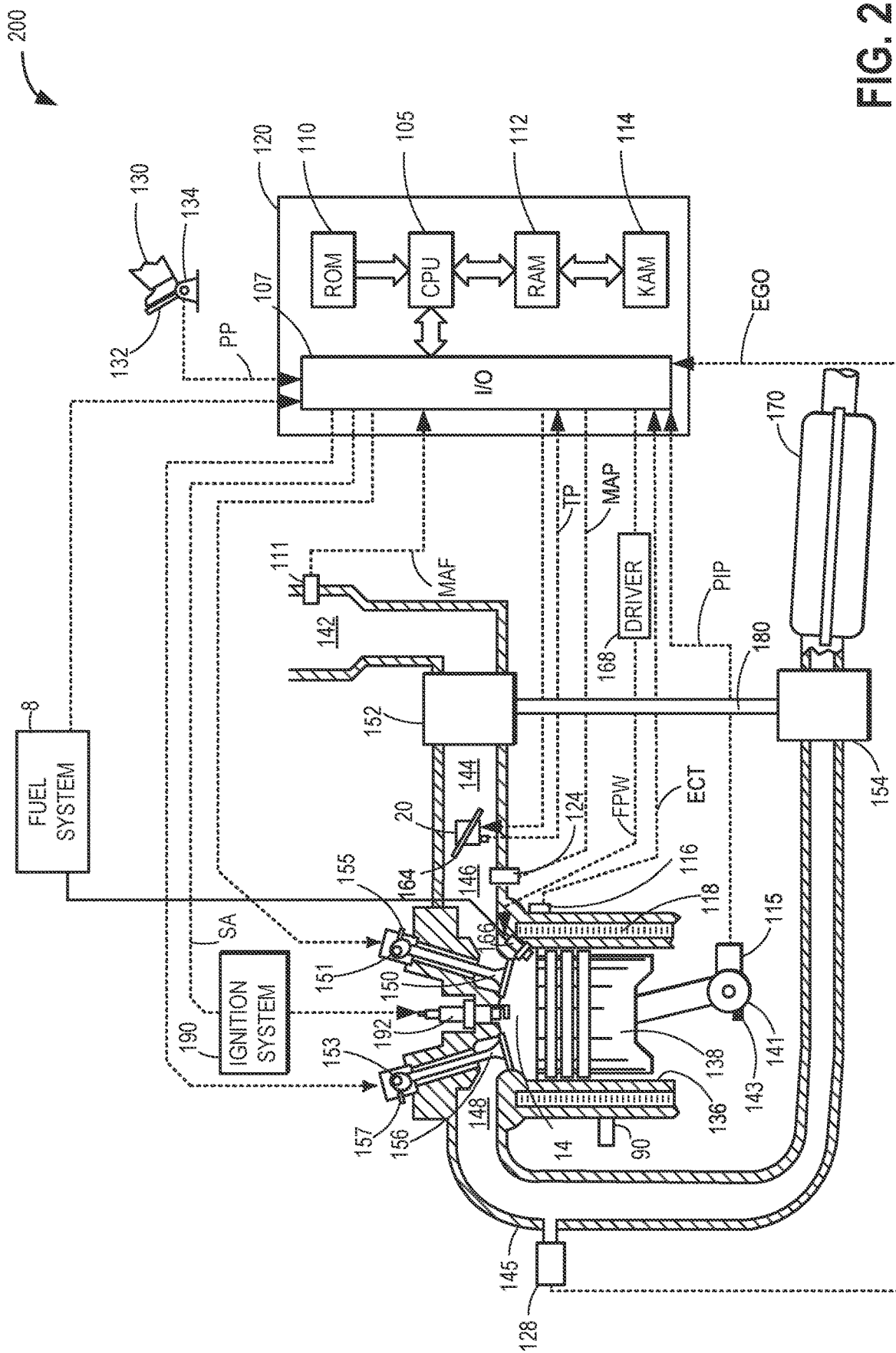
FIG. 2 shows a schematic diagram of a portion of the vehicle system of FIG. 1, the portion of the vehicle system including a combustion chamber having intake valves and/or exhaust valves driven via camshaft.
Figure 3:
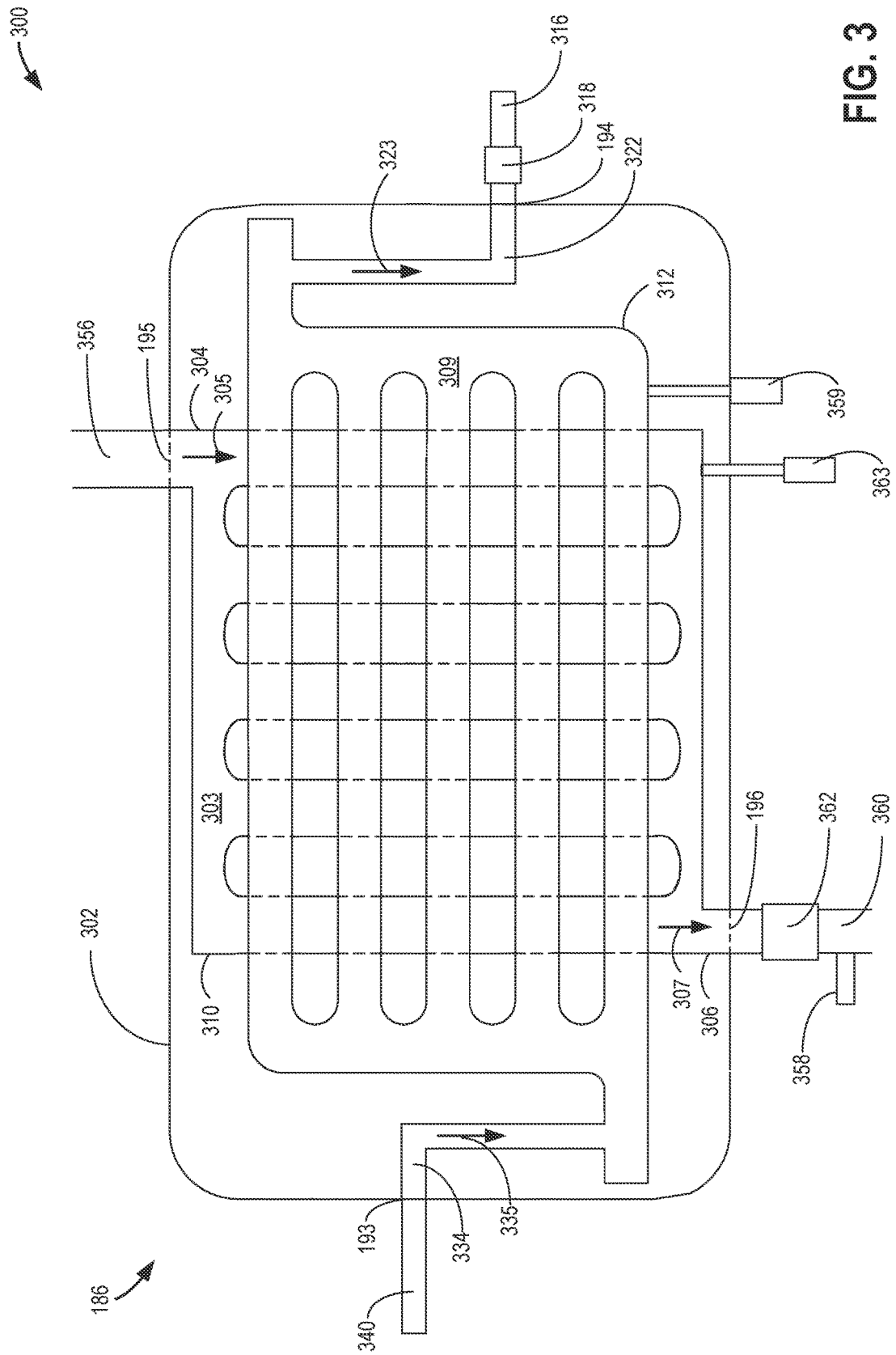
FIG. 3 shows an embodiment of a dual heat exchanger including gas passages internal to the dual heat exchanger.
Figure 4:
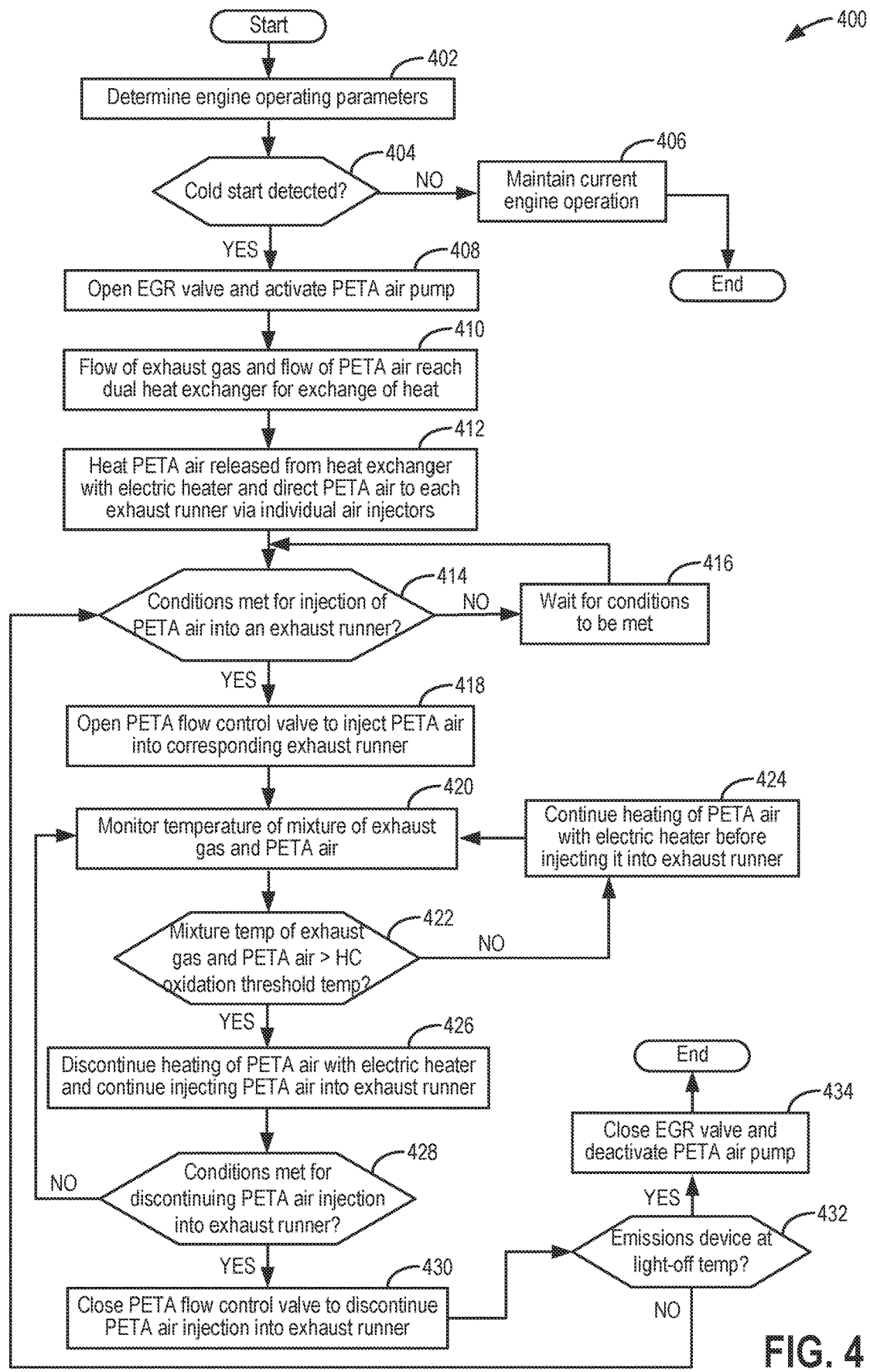
FIG. 4 shows a high level flow chart illustrating a method for heating an emission control device via a dual heat exchanger and secondary air introduction system.
Figure 5A:
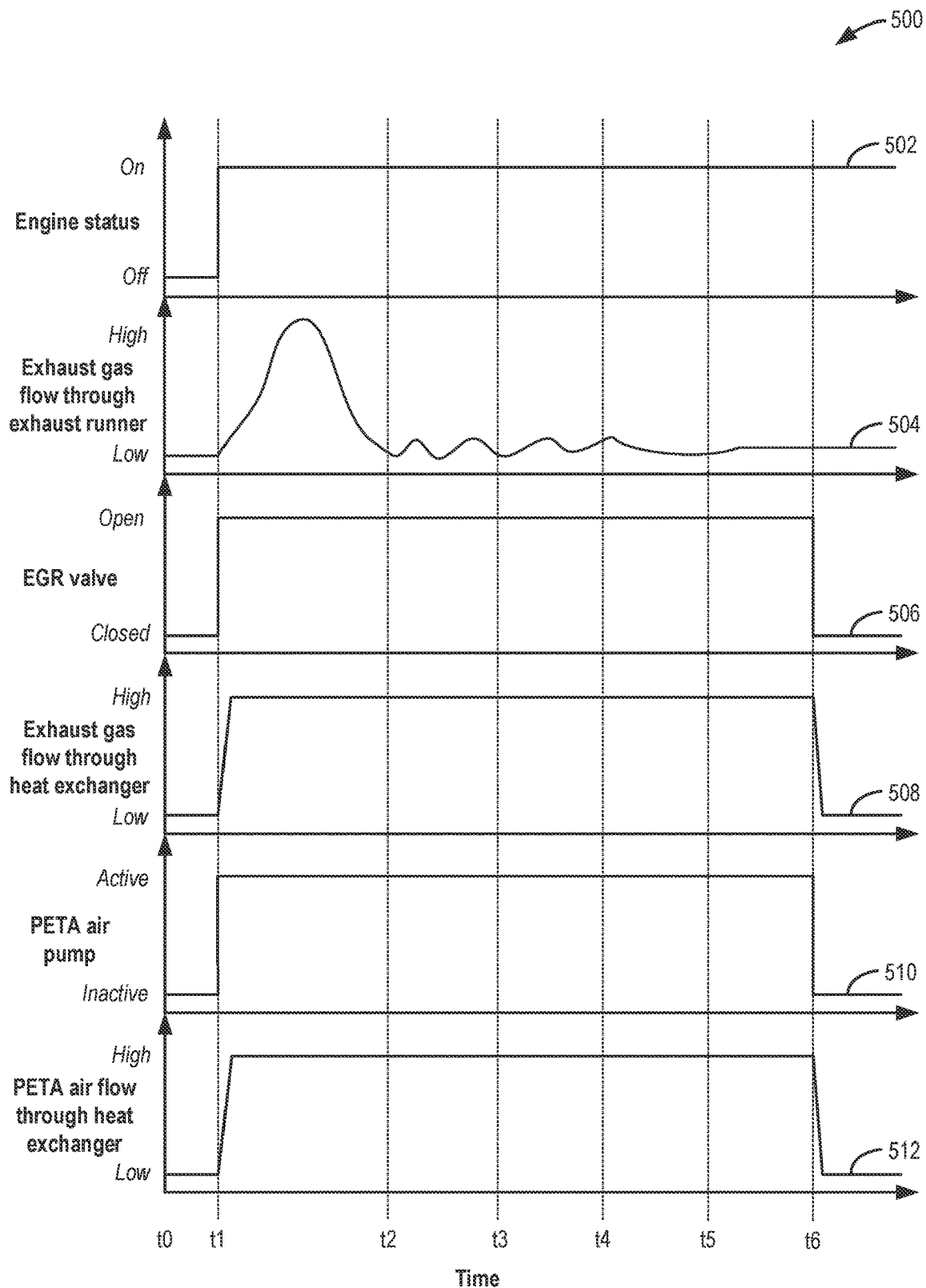
FIGS. 5A-5B show example timeline graphs illustrating the operations of dual heat exchanger, secondary air system and exhaust gas recirculation based on engine operating conditions during the execution of the method of FIG. 4.
Figure 5B:
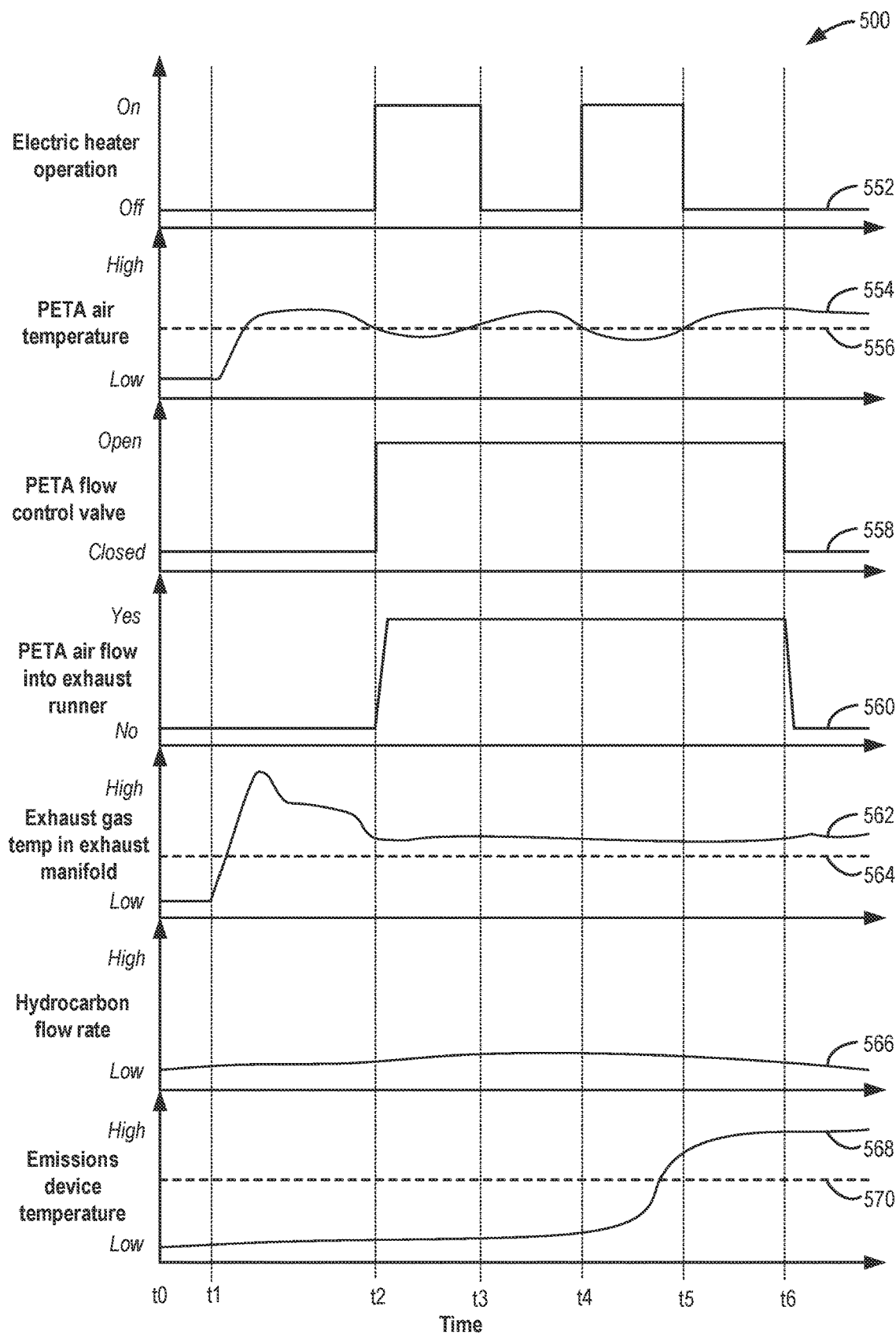
Figure 6:
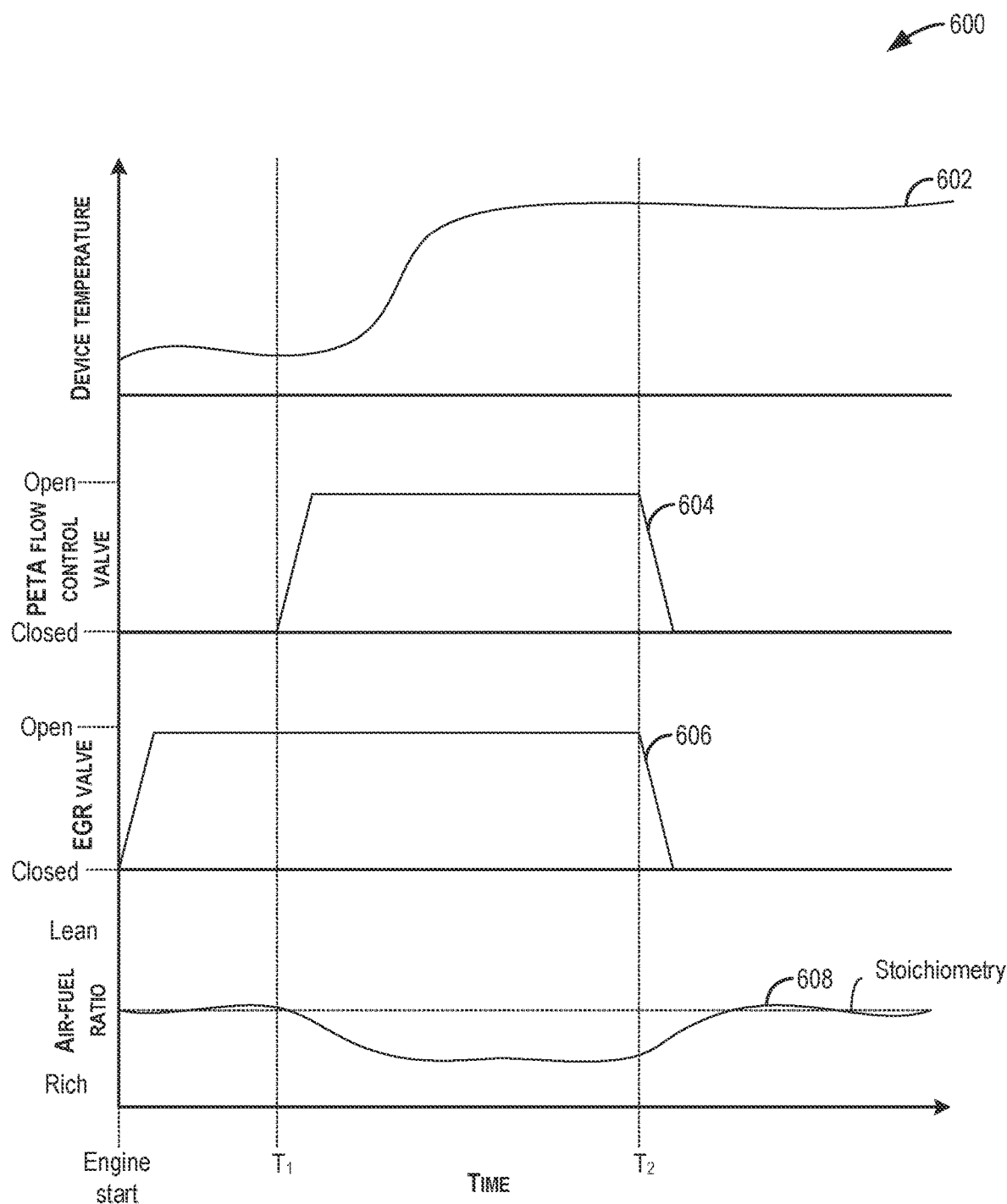
FIG. 6 shows a diagram illustrating various engine operating parameters related to stoichiometry of air-fuel ratio during the execution of the method of FIG. 4.

The following description relates to methods and systems for reducing hydrocarbon emissions from an internal combustion engine by utilizing secondary air injection and high-pressure exhaust gas recirculation during an engine cold start, as shown in the engine schematic of the vehicle system of FIG. 1. A portion of the vehicle system of FIG. 1 is illustrated in FIG. 2, including a combustion chamber having intake valves and/or exhaust valves driven via camshaft. An embodiment of a dual heat exchanger coupled to the secondary air injection system and the exhaust gas recirculation system is shown in FIG. 3. The dual heat exchanger includes internal gas passages to allow a flow of secondary air and a flow of exhaust gas to pass through without mixing for exchange of heat. A flow chart illustrating a method for heating an emission control device of the engine via the dual heat exchanger and the secondary air injection system is shown in FIG. 4. Further, FIGS. 5A-5B provides a graphical display of an exemplary engine operating sequence to illustrate the operations of the dual heat exchanger, secondary air injection and exhaust gas recirculation in greater detail. A diagram illustrating various operating parameters related to stoichiometry of air-fuel ratio is shown in FIG. 6.

Referring to FIG. 1, it shows a schematic depiction of a vehicle system 106. The vehicle system 106 includes an engine system 108, including engine 100 coupled to emission control system 122. Engine 100 includes a plurality of cylinders 14. Engine 100 also includes an intake 123 and an exhaust 125. Intake 123 may receive fresh air from the atmosphere through intake passage 142. Air entering intake passage 142 may be filtered by air filter 191. Intake passage 142 may include an air intake throttle 164 positioned downstream of an intake compressor 152. Intake throttle 164 may be configured to adjust the flow of intake gas (e.g., boosted intake air) entering engine intake manifold 144. Exhaust 125 includes an exhaust manifold 148 leading to an exhaust passage 145 that routes exhaust gas to the atmosphere via tailpipe 135.

Engine 100 may be a boosted engine including a boosting device, such as turbocharger 163. Turbocharger 163 may include intake compressor 152, arranged along intake passage 142, and an exhaust turbine 154, arranged along exhaust passage 145. Compressor 152 may be at least partially driven by turbine 154 via shaft 180. The amount of boost provided by the turbocharger may be varied by an engine controller.

Emission control system 122, coupled to exhaust passage 145, includes an emission control device 170. Emission control device 170 may include multiple catalyst bricks, in one example. In another example, multiple emission control devices, each with multiple bricks, can be used. Emission control device 170 can be a three-way type catalyst in one example. In other examples, emission control device 170 may be an oxidation catalyst, lean NOx trap, selective catalyst reduction (SCR) device, particulate filter, or other exhaust treatment device. While emission control device 170 is arranged downstream of turbine 154 in the embodiments described herein, in other embodiments, emission control device 170 may be arranged upstream of a turbocharger turbine or at another location in the engine exhaust passage without departing from the scope of this disclosure.

In some examples, vehicle system 106 may further include a low-pressure EGR (LP-EGR) system (not shown). The LP-EGR system may include a LP-EGR passage that couples exhaust passage 145, downstream of exhaust emission control device 170 with air intake passage 142, upstream of compressor 152. An EGR cooler (not shown) and a LP-EGR valve (not shown) may be arranged in LP-EGR passage to cool the exhaust gas flowing therethrough and to vary an amount and/or rate of exhaust gas recirculated from the exhaust passage to the intake passage via the LP-EGR system respectively.

In some examples (as depicted), vehicle system 106 may further include a high-pressure EGR (HP-EGR) system 171. HP-EGR system 171 includes an EGR passage 173 that couples exhaust passage 145 upstream of turbine 154, and couples air intake passage 142 downstream of compressor 152 and upstream of intake throttle 164. An EGR cooler 172 arranged in EGR passage 173 cools exhaust gas flowing there-through. A position of EGR valve 179, located in EGR passage 173 close to the coupling point of exhaust passage 145 and EGR passage 173, may be adjusted by controller 120 to vary an amount and/or rate of exhaust gas recirculated from the exhaust passage to the intake passage via the HP-EGR system. In some embodiments, one or more sensors may be positioned within HP-EGR passage 173 to provide an indication of one or more of a pressure, temperature, and air-fuel ratio of exhaust gas recirculated through the HP-EGR passage.

The EGR passage 173 is further connected to a heat exchanger 186, such that the heat exchanger 186 is arranged in between the EGR cooler 172 and the EGR valve 179. The heat exchanger 186 comprises an exhaust inlet port 193 and an exhaust outlet port 194. The exhaust inlet port 193 of the heat exchanger 186 is fluidically coupled with the EGR passage 173 downstream of the EGR valve 179 and upstream of the heat exchanger 186 to permit exhaust gases to flow into the heat exchanger 186. The exhaust outlet port 194 of the heat exchanger 186 is fluidically coupled with the EGR passage 173 upstream of the EGR cooler 172 and downstream of the heat exchanger 186 to permit exhaust gases to flow out of the heat exchanger 186. In this manner, the heat exchanger 186 is configured to admit exhaust tapped from upstream of the emission control device 170 and downstream of the exhaust manifold 148. The EGR valve 179 may be opened to admit a controlled amount of exhaust gas to the heat exchanger 186 during certain operating conditions. The exhaust gas flowing out of the heat exchanger 186 finally flows back into the air intake passage 142 via the EGR cooler 172 located in the EGR passage 173. More details regarding the heat exchanger 186 will be presented in FIG. 3.

To rapidly heat the emission control device 170, the vehicle system 106 may include a secondary air introduction system, also referred to as a ported electric thermactor air (PETA) system, to introduce oxygen-rich secondary air into the exhaust upstream of the emission control device 170. The excess oxygen in the secondary air reacts with reductants, such as unburnt fuel, in the exhaust to create an exothermic reaction that will heat the emission control device. To efficiently introduce the secondary air to the exhaust, boosted air downstream of the compressor 152 may be routed to the exhaust via a secondary air injection passage 187.

As shown in FIG. 1, the secondary air injection passage 187 is coupled to the air intake passage 142 downstream of compressor 152 and upstream of intake throttle 164. A PETA air pump 182 is coupled to the secondary air injection passage 187 close to the air intake passage 142. The PETA air pump 182 may be used to provide pressure to divert air flow from the air intake passage 142 to the secondary air injection passage 187. The secondary air injection passage 187 is further connected to the heat exchanger 186 downstream of the PETA air pump 182.

Additionally, an electric heater 188 may be arranged in the secondary air injection passage 187 downstream of the heat exchanger 186. The heat exchanger 186 may comprise a PETA inlet port 195 and a PETA outlet port 196. The PETA inlet port 195 of the heat exchanger 186 is fluidically coupled with the secondary air injection passage 187 downstream of the PETA air pump 182 and upstream of the heat exchanger 186 to permit PETA air to flow into the heat exchanger 186. The PETA outlet port 196 of the heat exchanger 186 is fluidically coupled with the secondary air injection passage 187 upstream of the electric heater 188 and downstream of the heat exchanger 186 to permit PETA air to flow out of the heat exchanger 186. In this manner, the heat exchanger 186 is configured to admit secondary air from the air intake passage 142 downstream of compressor 152. The PETA air pump 182 may be turned on or off to admit a controlled amount of secondary air to the heat exchanger 186 during certain operating conditions. The secondary air flowing out of the heat exchanger may be heated by the electric heater 188 located downstream of the heat exchanger 186 before being directed to exhaust runners of the exhaust manifold 148. As depicted, secondary air in the secondary air injection passage 187 may be injected into each exhaust runner via individual air injectors to mix with exhaust gas. For example, secondary air may be injected into an exhaust runner 197 of the exhaust manifold 148 via an air injector 198, and so on. The injection of secondary air into each exhaust runner via individual air injectors may be regulated by a PETA flow control valve 189. Additionally, a measurement from a temperature sensor 126 at exhaust manifold 148 is used to control mixture temperature of exhaust gas and secondary air. Example engine operating parameters during an engine cold start, in which an emission control device is heated via a dual heat exchanger to heat PETA air and cool HP EGR and then further heat PETA air with electric heater, are illustrated in greater detail in FIG. 4.

Engine 100 may be controlled at least partially by a control system 140 including controller 120 and by input from a vehicle operator via an input device (not shown). Control system 140 is configured to receive information from a plurality of sensors 160 (various examples of which are described herein) and sending control signals to a plurality of actuators 181. As one example, sensors 160 may include exhaust gas oxygen sensor (not shown) coupled to exhaust manifold 148, MAP sensor 121 coupled to intake manifold 144, exhaust catalyst temperature sensor 117, exhaust pressure sensor 119 located upstream of emission control device 170 in tailpipe 135, exhaust temperature sensor 127 and exhaust pressure sensor 129 located downstream of emission control device 170 in tailpipe 135. Various exhaust gas sensors may also be included in exhaust passage 145 downstream of emission control device 170, such as particulate matter (PM) sensors, NOx sensors, oxygen sensors, ammonia sensors, hydrocarbon sensors, etc. Other sensors such as additional pressure, temperature, air/fuel ratio and composition sensors may be coupled to various locations in the vehicle system 106. As another example, actuators 181 may include fuel injector 166, EGR valve 179, and intake throttle 164. Other actuators, such as a variety of additional valves and throttles, may be coupled to various locations in vehicle system 106. Controller 120 may receive input data from the various sensors, process the input data, and trigger the actuators in response to the processed input data based on instruction or code programmed therein corresponding to one or more routines. Example control routines are described herein with regard to FIGS. 4-5.

As further elaborated herein with reference to FIGS. 3-6B, depending on certain operating conditions (e.g., during cold start), some exhaust gases may be diverted from exhaust passage 145 to the heat exchanger 186 via the EGR passage 173. The controller 120 may be configured to control the EGR valve 179 to permit entry of exhaust gases into the heat exchanger 186. Additionally, the controller 120 may be configured to control the PETA air pump 182 to direct secondary air from the air intake passage 142 into the heat exchanger 186 via secondary air injection passage 187. The PETA air pump 182, being active, may provide pressure to draw adequate air flow into the heat exchanger 186 from the air intake passage 142. The heat exchanger 186 is a two-way or dual gas-to gas heat exchanger having two separate gas paths: a plurality of first passages and a plurality of second passages. In some examples, each of the plurality of first passages may be horizontal, while each of the plurality of second passages may be vertical. In other examples, however, the plurality of first passages may be vertical, while the plurality of second passages may be horizontal. In yet other examples, the plurality of first passages and the plurality of second passages may have orientations other than being vertical or horizontal. The exhaust gas may flow through the plurality of first passages, while the secondary air may flow through the plurality of second passages of the heat exchanger 186. Heat transfer may occur between the exhaust gas and secondary air, such that the secondary air is heated up and the exhaust gas is cooled down while flowing through the heat exchanger 186. The controller 120 may additionally be configured to control the electric heater 188 to further heat the secondary air flowing out of the heat exchanger 186 and increase a temperature of the secondary air above a hydrocarbon oxidation threshold temperature. The controller 120 may further be configured to inject secondary air flow into each exhaust runner in the exhaust manifold 148 via controlling the PETA flow control valve 189 during selected engine operating conditions to reduce HC emissions. In one example, the secondary air may be injected into an exhaust runner only during an exhaust stroke of the corresponding cylinder. Additionally, the secondary air may not be injected into the exhaust runner during its exhaust gas blowdown. In some examples, as elaborated herein with reference to FIGS. 3-6B, controller 120 may simultaneously direct the exhaust gas flowing out of the heat exchanger to the air intake passage 142 via EGR cooler 172. In this way, as elaborated herein with reference to FIGS. 3-6B, the controller may be configured to heat the emission control device of an engine by coordinating the HP-EGR system with the secondary air introduction system in order to reduce HC emissions during engine cold start.

FIG. 2 depicts an example embodiment of a combustion chamber or cylinder of internal combustion engine 100, e.g., of FIG. 1. While not shown in FIG. 2, the engine 100 may also be similarly coupled to the PETA system described above in FIG. 1. Engine 100 may receive control parameters from a control system including controller 120 and input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 100 may include combustion chamber walls 136 with piston 138 positioned therein. Piston 138 may be coupled to crankshaft 141 so that reciprocating motion of the piston is translated into rotational motion of the crankshaft. Crankshaft 141 may be coupled to at least one drive wheel of the passenger vehicle via a transmission system. Further, a starter motor may be coupled to crankshaft 141 via a flywheel to enable a starting operation of engine 100. Additionally, a crankshaft position sensor 143 may be coupled to the crankshaft 141 to estimate engine speed and piston position.

Cylinder 14 can receive intake air via a series of intake air passages 142, 144, and 146. Intake air passage 146 can communicate with other cylinders of engine 100 in addition to cylinder 14. In some embodiments, one or more of the intake passages may include a boosting device such as a turbocharger or a supercharger. For example, FIG. 1 shows engine 100 configured with a turbocharger including a compressor 152 arranged between intake passages 142 and 144, and an exhaust turbine 154 arranged along exhaust passage 145. Compressor 152 may be at least partially powered by exhaust turbine 154 via a shaft 180 where the boosting device is configured as a turbocharger. However, in other examples, such as where engine 100 is provided with a supercharger, exhaust turbine 154 may be optionally omitted, where compressor 152 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 152 as shown herein, or alternatively may be provided upstream of compressor 152.

Exhaust manifold 148 can receive exhaust gases from other cylinders of engine 100 in addition to cylinder 14. An exhaust passage 145 may be coupled to the exhaust manifold 148. While not shown in FIG. 2, the exhaust passage 145 may be similarly coupled to the intake passage 142 via the HP-EGR system shown previously in FIG. 1. An exhaust gas sensor 128 is shown coupled to the exhaust passage 145 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof, as described above.

Exhaust temperature may be estimated by one or more temperature sensors (not shown) located in exhaust passage 145. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 100 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 100, including cylinder 14, may include at least two intake poppet valves and at least two exhaust poppet valves located at an upper region of the cylinder.

Intake valve 150 may be controlled by controller 120 by cam actuation via cam actuation system 151. Similarly, exhaust valve 156 may be controlled by controller 120 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 120 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 100 may include a spark plug 192 for initiating combustion. Ignition system 190 can provide an ignition spark to combustion chamber 14 via spark plug 192 in response to spark advance signal SA from controller 120, under select operating modes. However, in some embodiments, spark plug 192 may be omitted, such as where engine 100 may initiate combustion by auto-ignition or by injection of fuel as may be the case with some diesel engines.

In some embodiments, each cylinder of engine 100 may be configured with one or more fuel injectors for providing fuel thereto. As a non-limiting example, cylinder 14 is shown including one fuel injector 166. Fuel injector 166 is shown coupled directly to cylinder 14 for injecting fuel directly therein in proportion to the pulse width of signal FPW received from controller 120 via electronic driver 168. In this manner, fuel injector 166 provides what is known as direct injection (hereafter also referred to as "DI") of fuel into combustion cylinder 14. While FIG. 1 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 120. It will be appreciated that, in an alternate embodiment, injector 166 may be a port injector providing fuel into the intake port upstream of cylinder 14.

It will also be appreciated that while the depicted embodiment illustrates the engine being operated by injecting fuel via a single direct injector; in alternate embodiments, the engine may be operated by using two injectors (for example, a direct injector and a port injector) and varying a relative amount of injection from each injector.

Fuel may be delivered by the injector to the cylinder during a single cycle of the cylinder. Further, the distribution and/or relative amount of fuel delivered from the injector may vary with operating conditions. Furthermore, for a single combustion event, multiple injections of the delivered fuel may be performed per cycle. The multiple injections may be performed during the compression stroke, intake stroke, or any appropriate combination thereof. Also, fuel may be injected during the cycle to adjust the air-to-injected fuel ratio (AFR) of the combustion. For example, fuel may be injected to provide a stoichiometric AFR. An AFR sensor may be included to provide an estimate of the in-cylinder AFR. In one example, the AFR sensor may be an exhaust gas sensor, such as EGO sensor 128. By measuring an amount of residual oxygen (for lean mixtures) or unburned hydrocarbons (for rich mixtures) in the exhaust gas, the sensor may determine the AFR. As such, the AFR may be provided as a Lambda ($\lambda$) value, that is, as a ratio of actual AFR to stoichiometry for a given mixture. Thus, a Lambda of 1.0 indicates a stoichiometric mixture, richer than stoichiometry mixtures may have a lambda value less than 1.0, and leaner than stoichiometry mixtures may have a lambda value greater than 1.

As described above, FIG. 2 shows only one cylinder of a multi-cylinder engine. As such each cylinder may similarly include its own set of intake/exhaust valves, fuel injector(s), spark plug, etc.

Fuel tanks in fuel system 8 may hold fuel with different fuel qualities, such as different fuel compositions. These differences may include different alcohol content, different octane, different heat of vaporizations, different fuel blends, and/or combinations thereof etc.

Engine 100 may further include a knock sensor 90 coupled to each cylinder 14 for identifying abnormal cylinder combustion events. In alternate embodiments, one or more knock sensors 90 may be coupled to selected locations of the engine block. The knock sensor may be an accelerometer on the cylinder block, or an ionization sensor configured in the spark plug of each cylinder. The output of the knock sensor may be combined with the output of a crankshaft acceleration sensor to indicate an abnormal combustion event in the cylinder.

Controller 120 is shown as a microcomputer, including microprocessor unit 105, input/output ports 107, an electronic storage medium for executable programs and calibration values shown as read only memory chip 110 in this particular example, random access memory 112, keep alive memory 114, and a data bus. Controller 120 may receive various signals from sensors coupled to engine 100, in addition to those signals previously discussed, including measurement of inducted mass air flow (MAF) from mass air flow sensor 111; engine coolant temperature (ECT) from temperature sensor 116 coupled to cooling sleeve 118; a profile ignition pickup signal (PIP) from Hall effect sensor 115 (or other type) coupled to crankshaft 141; throttle position (TP) from a throttle position sensor; absolute manifold pressure signal (MAP) from sensor 124, cylinder AFR from EGO sensor 128, and abnormal combustion from knock sensor 90 and a crankshaft acceleration sensor. Engine speed signal, RPM, may be generated by controller 120 from signal PIP. Manifold pressure signal MAP from a manifold pressure sensor may be used to provide an indication of vacuum, or pressure, in the intake manifold.

Storage medium read-only memory 110 can be programmed with computer readable data representing instructions executable by processor 105 for performing the methods described below as well as other variants that are anticipated but not specifically listed. Example routines are shown with reference to FIGS. 4-6B.

In some examples, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within engine 100 typically undergoes a four stroke cycle: the cycle includes the intake stroke, compression stroke, expansion stroke, and exhaust stroke. During the intake stroke, generally, the exhaust valve 156 closes and intake valve 150 opens. Air is introduced into combustion chamber 14 via intake manifold 146, and piston 138 moves to the bottom of the cylinder so as to increase the volume within combustion chamber 14. The position at which piston 138 is near the bottom of the cylinder and at the end of its stroke (e.g. when combustion chamber 14 is at its largest volume) is typically referred to by those of skill in the art as bottom dead center (BDC). During the compression stroke, intake valve 150 and exhaust valve 156 are closed. Piston 138 moves toward the cylinder head so as to compress the air within combustion chamber 14. The point at which piston 138 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 192, resulting in combustion. During the expansion stroke, the expanding gases push piston 138 back to BDC. Crankshaft 40 converts piston movement into a rotational torque of the rotary shaft. Finally, during the exhaust stroke, the exhaust valve 156 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples.

Based on the timing differences between exhaust valve closing and intake valve opening, the valves may be operated with negative valve overlap wherein for a short duration after the end of the exhaust stroke and before the commencement of the intake stroke, both intake and exhaust valves are closed. This period, during which both valves are closed, is referred to as negative (intake to exhaust) valve overlap. In one example, the VCT system may be adjusted so that the negative intake to exhaust valve overlap timing may be a default cam position of the engine during cylinder combustion.

Alternatively, the valves may be operated with positive valve overlap wherein for a short duration before the end of the exhaust stroke and after the commencement of the intake stroke, both intake and exhaust valves may be open. This period, during which both valves may be open, is referred to as a positive (intake to exhaust) valve overlap. The VCT system may be adjusted so that an amount of positive valve overlap during selected boosted engine operating conditions to increase positive valve overlap. Specifically, a position of the intake camshaft may be adjusted such that an opening of the intake valve timing is advanced. Consequently, the intake valve may be opened earlier before the end of the exhaust stroke and a duration over which both valves are open may be increased, leading to more positive valve overlap. As one example, positive valve overlap may be increased by moving the intake camshaft from a position of some positive valve overlap to a position having more positive valve overlap. As another example, positive valve overlap may be increased by moving the intake camshaft from a position of negative valve overlap to a position of positive valve overlap. In one example, the VCT system may be adjusted so that the negative intake to exhaust valve overlap timing may be a default cam position of the engine during an engine cold-start.

It will be appreciated that while the above example suggests increasing positive valve overlap by advancing intake opening timing, in alternate examples, positive valve overlap may be increased by adjusting an exhaust camshaft to retard exhaust valve closing. Further still, each of the intake and the exhaust camshafts may be adjusted to vary the positive valve overlap by varying both the intake and the exhaust valve timings. In other examples, cam lobe switching or variable valve lift may be used instead of variable camshaft timing.

FIG. 3 shows an embodiment 300 of the heat exchanger 186 of FIG. 1. Although not shown in FIG. 3, the heat exchanger 186 may be coupled to an HP-EGR system, an intake system and an exhaust system of a vehicle system (such as the vehicle system 106 shown by FIG. 1). As depicted in FIG. 3, the heat exchanger 186 includes a housing 302, a secondary air manifold 310 and an EGR manifold 312. The secondary air manifold 310 and the EGR manifold 312 are internal to the housing 302 of the heat exchanger 186. The secondary air manifold 310 further includes a plurality of first passages that may be oriented along a first direction inside the dual heat exchanger. The EGR manifold 312 further includes a plurality of second passages that may be oriented along a second direction inside the dual heat exchanger. The first direction of the plurality of first passages may be perpendicular to the second direction of the plurality of second passages. For example, the secondary air manifold 310 may include a plurality of vertical passages 303 coupled between a PETA inlet passage 304 and a PETA outlet passage 306 internal to the housing 302 of the heat exchanger 186. The EGR manifold 312 may include a plurality of horizontal passages 309 coupled between an EGR inlet passage 334 and an EGR outlet passage 322 internal to the housing 302 of the heat exchanger 186. The plurality of vertical passages 303 and the plurality of horizontal passages 309 of the heat exchanger 186 are configured proximate to each other within an internal volume of the heat exchanger 186 to facilitate a transfer of thermal energy from exhaust gases flowing through the plurality of horizontal passages 309 to secondary air flowing through the plurality of vertical passages 303. As an example, the plurality of horizontal passages 309 may be arranged approximately perpendicular to the plurality of vertical passages 303 within the housing 302 of the heat exchanger 186 to increase an interface area between the plurality of horizontal passages 309 and the plurality of vertical passages 303. Additionally, the plurality of horizontal passages 309 and the plurality of vertical passages 303 are co-planar, i.e., the plurality of horizontal passages 309 are arranged in a common plane which is parallel with a common plane of the plurality of vertical passages 303 in order to have maximum interface area. The interface area between the plurality of vertical passages 303 and the plurality of horizontal passages 309 may include a thermally conductive material (e.g., metal) to facilitate the transfer of thermal energy from exhaust gases flowing through the plurality of horizontal passages 309 to the secondary air flowing through the plurality of vertical passages 303, while retaining fluidic isolation of the exhaust gas from the secondary air. In other words, gases within the plurality of horizontal passages 309 may exchange thermal energy with the secondary air within the plurality of vertical passages 303, but the plurality of vertical passages 303 and the plurality of horizontal passages 309 do not exchange and/or mix gases with each other.

Included with and/or coupled to the housing 302 of the heat exchanger 186 are a plurality of inlet and outlet ports as described previously with reference to FIG. 1. The embodiment 300 of the heat exchanger 186 shown in FIG. 3 includes a PETA inlet port 195, a PETA outlet port 196, an exhaust inlet port 193, and an exhaust outlet port 194. Alternate embodiments may contain a different number of ports. For example, in one embodiment (not shown), the PETA outlet port 196 may be split into two or more PETA outlet ports receiving secondary air flow from the plurality of vertical passages 303.

The ports facilitate the flow of gases to and from the heat exchanger 186. The PETA inlet port 195 is coupled to the PETA inlet passage 304 of the secondary air manifold 310, internal to the housing 302 of the heat exchanger 186. The PETA inlet port 195 is also coupled to a first part 356 of the secondary air injection passage 187 (e.g., as shown in FIG. 1), external to the housing 302 of the heat exchanger 186. The first part 356 of the secondary air injection passage may be coupled, in turn, to an intake air passage (e.g., intake air passage 142 of FIG. 1) downstream of a compressor (e.g., compressor 152 of FIG. 1). Some of the intake air flow diverted from the intake air passage to the first part 356 of the secondary air injection passage via a PETA air pump (e.g., PETA air pump 182 of FIG. 1) may be sent to the secondary air manifold 310 of the heat exchanger 186 via the PETA inlet port 195 as indicated by arrow 305.

The PETA outlet port 196 is coupled to the PETA outlet passage 306 of the secondary air manifold 310, internal to the housing 302 of the heat exchanger 186. The PETA outlet port 196 is also coupled to a second part 360 of the secondary air injection passage 187 (e.g., as shown in FIG. 1), external to the housing 302 of the heat exchanger 186. The second part 360 of the secondary air injection passage may be coupled, in turn, to a plurality of exhaust runners (e.g., exhaust runners of the exhaust manifold 148 of FIG. 1) of a vehicle system (e.g., vehicle system 106 of FIG. 1). PETA air/secondary air flowing out of the secondary air manifold 310 of the heat exchanger 186 via the PETA outlet port 196 (e.g., as indicated by arrow 307) may be directed to the exhaust runners via the second part 360 of the secondary air injection passage. Additionally, the second part 360 of the secondary air injection passage may include a control valve 362. A flow of secondary air through the PETA outlet port 196 of the heat exchanger 186 may be regulated (e.g., increased or decreased) by actuation of the control valve 362 by a controller (e.g., controller 120 of FIG. 1).

Thus, compressed intake air flows as secondary air through PETA inlet port 195 into the PETA inlet passage 304 (internal to the or interior of the heat exchanger 186) towards the plurality of vertical passages 303 of the secondary air manifold 310. The compressed intake air flows through the plurality of vertical passages 303 towards the PETA outlet passage 306 and is directed to the PETA outlet port 196 after exchanging thermal energy with EGR gas (e.g., receiving heat from the EGR gas) in the EGR manifold 312 of the heat exchanger 186.

The exhaust inlet port 193 is coupled to the EGR inlet passage 334 of the EGR manifold 312, internal to the housing 302 of the heat exchanger 186. The exhaust inlet port 193 is also coupled to a first part 340 of the EGR passage 173 (e.g., as shown in FIG. 1), external to the housing 302 of the heat exchanger 186. The first part 340 of the EGR passage may be coupled, in turn, to an exhaust passage (e.g., exhaust passage 145 of FIG. 1) upstream of a turbine (e.g., turbine 154 of FIG. 1) of a vehicle system (e.g., vehicle system 106 of FIG. 1). Some or all of the exhaust gases may be diverted from the exhaust passage to the first part 340 of the EGR passage via an EGR valve (e.g., EGR valve 179 of FIG. 1) and may be sent to the EGR manifold 312 of the heat exchanger 186 via the exhaust inlet port 193 as indicated by arrow 335.

The exhaust outlet port 194 is coupled to the EGR outlet passage 322 of the EGR manifold 312, internal to the housing 302 of the heat exchanger 186. The exhaust outlet port 194 is also coupled to a second part 316 of the EGR passage 173 (e.g., as shown in FIG. 1), external to the housing 302 of the heat exchanger 186. The second part 316 of the EGR passage may be coupled, in turn, to an intake passage (e.g., intake passage 142 of FIG. 1) downstream of a compressor (e.g., compressor 152 of FIG. 1) of a vehicle system (e.g., vehicle system 106 of FIG. 1). The exhaust gases flowing out of the EGR manifold 312 of the heat exchanger 186 via the exhaust outlet port 194 (e.g., as indicated by arrow 323) may be directed to the intake passage via the second part 316 of the EGR passage. Additionally, the second part 316 of the EGR passage may include a control valve 318. A flow of exhaust gases through the exhaust outlet port 194 of the heat exchanger 186 may be regulated (e.g., increased or decreased) by actuation of the control valve 318 by a controller (e.g., controller 120 of FIG. 1).

Thus, exhaust gases may flow through the exhaust inlet port 193 into the EGR inlet passage 334 (internal to or interior of the heat exchanger 186) towards the plurality of horizontal passages 309 of the EGR manifold 312. The exhaust gases flow through the plurality of horizontal passages 309 towards the EGR outlet passage 322 and are directed to the exhaust outlet port 194 after exchanging thermal energy with the PETA air/secondary air (e.g., transferring heat to secondary air) in the secondary air manifold 310 of the heat exchanger 186.

Turning now to FIG. 4, a method 400 for heating an emission control device is presented. Method 400 may be carried out by controller 120 of FIGS. 1 and 2 according to instructions stored thereon in order to heat emission control device 170 via an exothermic reaction occurring in exhaust runners. Method 400 comprises, at 402, determining engine operating parameters. The determined engine operating parameters may include engine speed, engine load, engine temperature, exhaust temperature, time since engine start, etc. At 404, it is determined, based on the engine operating parameters, if an engine cold start is detected. The engine cold start may be an engine start and period of operation following an engine start where the engine is relatively cool, such as at ambient temperature at engine start. During the engine cold start, the emission control device may be below operating temperature, such as below its light-off temperature, and thus emissions in the exhaust, such as unburnt hydrocarbons, NOx, and CO, may pass through the device untreated and escape to the atmosphere. The device may continue to operate below optimal efficiency until the engine reaches operating temperature, which depending on the ambient temperature, may take from a few seconds to a minute or longer. To rapidly heat the emission control device during an engine cold start (e.g., within a few seconds), an exothermic reaction may be initiated by introducing oxygen-rich intake air to the exhaust upstream of the emission control device, where unburnt hydrocarbons and other reductants react with the oxygen to produce heat.

Thus, if it is determined at 404 that the engine is not operating under cold start condition, method 400 proceeds to 406, where current engine operation is maintained, as heating of the emission control device is not indicated. For example, if the engine is off and then the engine is operated with stoichiometric air-fuel ratio or other desired air-fuel ratio based on engine operating parameters and detected exhaust oxygen content, engine cold start is not detected. This may be because the engine may still be at or above a threshold operating temperature, where normal engine operation can proceed without secondary heating of the emission control device. Method 400 then ends.

However, if it is determined that the engine is operating under cold start conditions at 404, method 400 proceeds to heat the emission control device by using a dual heat exchanger (e.g., heat exchanger 186) to heat PETA air and cool HP EGR gas and further introduce the heated PETA air to the exhaust. To maintain a controlled exothermic reaction that does not result in high temperatures that may degrade exhaust system components, an EGR valve (e.g., EGR valve 179) may be coordinately adjusted with a PETA air pump (e.g., PETA air pump 182) and a PETA flow control valve (e.g., PETA flow control valve 189). Thus, at 408, the EGR valve is opened or maintained in the open position immediately following the engine start. Opening the EGR valve may divert exhaust gases from an exhaust passage (e.g., exhaust passage 145) to an EGR passage (e.g., EGR passage 173) upstream of a turbine (e.g., turbine 154).

The PETA air pump may have a nominal, e.g., default state of being deactivated, in order to avoid diverting intake air away from the intake manifold under conditions where heating of the emission control device is not indicated. However, immediately following the engine cold start, the PETA air pump is activated at 408. Activating the PETA air pump may divert intake air away from an intake passage (e.g., intake passage 142) to a secondary air injection passage (e.g., secondary air injection passage 187) downstream of a compressor (e.g., compressor 152).

Thus, at 408, by opening the EGR valve and activating the PETA air pump, flow of exhaust gas and flow of secondary air may be directed to the dual heat exchanger via the EGR passage and the secondary air injection passage, respectively.

At 410, the flow of exhaust gas and the flow of secondary air reach the dual heat exchanger for exchange of heat, wherein thermal energy from exhaust gas may be transferred to the secondary air such that the secondary air (also referred to as PETA air) is heated and the exhaust gas (also referred to as HP EGR gas) is cooled down. As described previously with reference to FIG. 3, secondary air may flow through a plurality of vertical passages (e.g., 303) of a secondary air manifold (e.g., 310) and exhaust gas may flow through a plurality of horizontal passages (e.g., 309) of an EGR manifold (e.g., 312) internal to a housing (e.g., 302) of the heat exchanger. The proximate configuration of the plurality of vertical passages and the plurality of horizontal passages within an internal volume of the heat exchanger facilitates a transfer of thermal energy from exhaust gases to secondary air/PETA air without fluidic mixing of the exhaust gases and PETA air.

At 412, PETA air and exhaust gas flow out of the heat exchanger via a PETA outlet port (e.g., 196) and an exhaust outlet port (e.g., 194), respectively, after exchange of heat. The exhaust gases may be directed to the intake passage (e.g., 142) upstream of an intake throttle (e.g., 164) and downstream of a compressor (e.g., 152) via an EGR cooler (e.g., 172) arranged in the EGR passage (e.g., 173). The EGR cooler, however, remains inactive during engine cold start. The PETA air flowing out of the heat exchanger, at 412, may further be heated with an electric heater (e.g., 188) arranged in the secondary air injection passage. For example, the PETA air may be heated above a threshold temperature for hydrocarbon oxidation using the electric heater. The heated PETA air may subsequently be directed to exhaust runners via the secondary air injection passage.

At 414, it is determined whether conditions are met for injection of PETA air into an exhaust runner. For example, PETA air may be introduced to each exhaust runner only during an exhaust stroke of the corresponding cylinder. The PETA air flow may not be provided to the exhaust runner during an exhaust gas blowdown, but may only be introduced to the exhaust runner immediately after the exhaust gas blowdown. For example, the controller may receive information from a sensor monitoring crankshaft position (e.g., a crankshaft position sensor 143) to determine piston position. If it is determined, at 414, that the conditions are not met for injection of PETA air into the exhaust runner, method 400 proceeds to 416, where PETA flow control valve (e.g., 189) of an air injector (e.g., 198) connecting the corresponding exhaust runner (e.g., 197) is maintained closed. Accordingly, at 416, method 400 waits for conditions to be met. Method 400 may then return to 414. Alternatively, if it is determined, at 414, that the conditions for injection of PETA air into the exhaust runner are met, method 400 proceeds to 418.

At 418, PETA flow control valve of the air injector connecting the corresponding exhaust runner is opened or maintained in an open position to initiate the flow of heated PETA air into the exhaust runner. The injection of heated PETA air into the exhaust runner, at 418, leads to mixing of PETA air with exhaust gases present in the corresponding exhaust runner. The mixing of oxygen-rich heated PETA air with exhaust gases, in turn, leads to initiation of an exothermic reaction, where unburnt hydrocarbons and other reductants react with the oxygen to produce heat, upstream of the emission control device.

In the illustrated example method, injection of PETA air into one exhaust runner via a corresponding air injector is described. However, it should be noted that the method may include injection of PETA air into multiple exhaust runners via individual air injectors at the same time, depending on where exhaust gas blowdown is achieved. Therefore, the PETA flow control valve of each air injector may be regulated accordingly.

At 420, a temperature of the mixture of exhaust gas and PETA air is monitored. As one example, the mixture temperature of exhaust gas and PETA air may be measured and/or monitored by using a temperature sensor (e.g., temperature sensor 126) located in an exhaust manifold (e.g., exhaust manifold 148) of the vehicle system.

At 422, it is determined whether the mixture temperature of exhaust gas and PETA air is greater than the HC oxidation threshold temperature. If it is determined, at 422, that the mixture temperature of exhaust gas and PETA air is lower than the HC oxidation threshold temperature, method 400 proceeds to 424 to continue heating the PETA air with the electric heater before the PETA air is injected into the exhaust runners. Method 400 may then return to 420, where the temperature of the mixture of exhaust gas and PETA air is continued to be monitored.

Alternatively, if it is determined, at 422, that the mixture temperature of exhaust gas and PETA air is greater than the HC oxidation threshold temperature, method 400 proceeds to 426. At 426, method 400 discontinues heating of PETA air with electric heater, e.g., the electric heater is deactivated, and continues injecting PETA air into the exhaust runners.

At 428, method 400 determines whether the conditions are met for discontinuing PETA air injection into the exhaust runners. As one example, if a cylinder is undergoing an intake stroke, compression stroke, or expansion stroke of the four stroke cycle, PETA air injection into the corresponding exhaust runner may be discontinued. As another example, if the exhaust runner is undergoing an exhaust gas blowdown, PETA air injection into the exhaust runner may be discontinued. If it is determined, at 428, that the conditions for discontinuing PETA air injection into the exhaust runners are not met, the method returns to 420, where the mixture temperature of exhaust gas and PETA air is continued to be monitored while the PETA air is being injected into the exhaust runners. Alternatively, if it is determined, at 428, that the conditions for discontinuing PETA air injection into the exhaust runners are met, the method proceeds to 430. At 430, method 400 includes closing the PETA flow control valves of the air injectors to discontinue PETA air injection into the corresponding exhaust runners.

At 432, it is determined if the emission control device (e.g., 170) is at light-off or another predefined operating temperature. The temperature of the emission control device may be determined based on operating conditions, such as exhaust temperature and mass flow rate, or it may be determined based on feedback from a temperature sensor (e.g., 117) in the device. If the device has not yet reached the light-off or predefined operating temperature, method 400 returns to 414 to confirm if conditions are met for injecting the PETA air into the exhaust runner. However, if the device has reached the light-off or predefined operating temperature, method 400 proceeds to 434 to close the EGR valve and deactivate the PETA air pump, and operate the engine with stoichiometric air-fuel ratio or other desired air-fuel ratio. Method 400 then ends.

Turning to FIGS. 5A-5B, a timing diagram 500 of an exemplary engine operating sequence to illustrate the operations of the dual heat exchanger, secondary air injection and exhaust gas recirculation is shown. FIGS. 5A and 5B are described herein collectively. Instructions for performing the actions described in the timing diagram 500 may be executed by a controller (e.g., controller 120 of FIGS. 1-2) based on instructions stored on a memory of the controller and in conjunction with signals received from sensors (e.g., sensors 160 of FIGS. 1-2) of the vehicle system.

Timing diagram 500 shows plots 502, 504, 506, 508, 510, 512, 552, 554, 558, 560, 562, 566 and 568, which illustrate states of components of the vehicle system over time. Plot 502 indicates a state of an engine of the vehicle, which may be in an ON state or an OFF state. Plot 504 indicates exhaust gas flowing through an exhaust runner, which may be HIGH or LOW. Plot 506 indicates a position of the EGR valve, which may be in an OPEN position or a CLOSED position. Plot 508 indicates a flow of exhaust gas through a dual heat exchanger, which may be HIGH or LOW. Plot 510 indicates a state of the PETA air pump, which may be in an ACTIVE state or an INACTIVE state. Plot 512 indicates a flow of secondary air through the dual heat exchanger, which may be HIGH or LOW. Plot 552 indicates a state of an electric heater, which may be in an ON state or an OFF state. Plot 554 indicates a temperature of the secondary air, which may be HIGH or LOW. Plot 558 indicates a position of the PETA flow control valve, which may be in an OPEN position or a CLOSED position. Plot 560 indicates a flow of secondary air into a corresponding exhaust runner, where YES means secondary air is flowing into the exhaust runner and NO means secondary air is not flowing into the exhaust runner. Plot 562 indicates a temperature of the mixture of secondary air and exhaust gas, which may be HIGH or LOW. Plot 566 indicates a flow rate of hydrocarbon, which may be HIGH or LOW. Plot 568 indicates a temperature of an emission control device, which may be HIGH or LOW. Dotted lines 556 and 564 represent a threshold temperature for hydrocarbon oxidation. Dotted line 570 represents a light-off temperature of the emission control device.

Plots 502, 504, 506, 508, 510, 512, 552, 554, 558, 560, 562, 566 and 568 illustrate states of the above mentioned components of the vehicle system across six durations: a first duration from time t0 to time t1; a second duration from time t1 to time t2; a third duration from time t2 to time t3; a fourth duration from time t3 to time t4; a fifth duration from time t4 to time t5; and a sixth duration from time t5 to time t6.

At time t0 and over the first duration from time t0 to time t1, the vehicle engine is in an OFF state at plot 502. Accordingly, the method waits for a cold start of the engine.

At time t1, the vehicle engine is started and is in an ON state at plot 502 and the exhaust gas begins to flow through the exhaust runner at plot 504. Accordingly, at time t1, the EGR valve is opened at plot 506 and the PETA air pump is activated as represented by plot 510. As such, exhaust gas begins to flow through the dual heat exchanger at plot 508, and secondary air begins to flow through the dual heat exchanger at plot 512. At plot 566, hydrocarbon flow rate is low, and at plot 568, a temperature of the emission control device remains low at the start of the engine. Over the second duration from time t1 to time t2, as the engine warms up, a temperature of the exhaust gas in exhaust manifold keeps rising beyond the temperature threshold for HC oxidation, at plot 562. Over the second duration from time t1 to time t2, at plot 504, the exhaust runner may show an exhaust gas blowdown pulse of the corresponding cylinder. Over the second duration from time t1 to time t2, a temperature of the secondary air keeps increasing and then stabilizes at a temperature above the threshold temperature for HC oxidation due to exchange of heat at the dual heat exchanger.

At time t2, the exhaust gas blowdown through the exhaust runner is completed and the flow of exhaust gas reaches a low level, at plot 504. The temperature of secondary air, at plot 554, drops below the threshold temperature for HC oxidation. As such, the electric heater is turned on, at plot 552, to further heat the secondary air flowing out of the dual heat exchanger. At time t2, the PETA flow control valve is opened, at plot 558. Accordingly, the heated secondary air begins to flow into the exhaust runner, at plot 560. The exhaust gas temperature in the exhaust manifold remains above the threshold temperature for HC oxidation, at plot 562. Over the third duration from time t2 to time t3, plots 502, 504, 506, 508, 510, 512, 552, 554, 558, 560, 562, 566 and 568 remain unchanged.

At time t3, the temperature of secondary air, at plot 554, reaches above the threshold temperature for HC oxidation. As such, the electric heater is turned off, at plot 552, to stop heating the secondary air flowing out of the dual heat exchanger. Over the fourth duration from time t3 to time t4, plots 502, 504, 506, 508, 510, 512, 552, 554, 558, 560, 562, 566 and 568 remain unchanged.

At time t4, the temperature of secondary air, at plot 554, again drops below the threshold temperature for HC oxidation. As such, the electric heater is turned on again, at plot 552, to further heat the secondary air flowing out of the dual heat exchanger. Over the fifth duration from time t4 to time t5, plots 502, 504, 506, 508, 510, 512, 552, 554, 558, 560, 562 and 566 remain unchanged. Over the fifth duration from time t4 to time t5, the temperature of the emission control device starts increasing, at plot 568.

At time t5, the temperature of secondary air, at plot 554, again reaches above the threshold temperature for HC oxidation. As such, the electric heater is turned off, at plot 552, to stop heating the secondary air flowing out of the dual heat exchanger. At time t5, the temperature of the emission control device reaches above the catalyst light-off temperature, at plot 568. Over the sixth duration from time t5 to time t6, plots 502, 504, 506, 508, 510, 512, 552, 554, 558, 560, 562, 566 and 568 remain unchanged.

At time t6, as the light-off temperature of the emission control device is achieved at plot 568, the operation of the dual heat exchanger, secondary air injection and exhaust gas recirculation may end. Accordingly, the PETA flow control valve is closed at plot 558, and thus, the flow of secondary air into the exhaust runner is discontinued at plot 560. Additionally, the EGR valve is closed at plot 506 to discontinue the flow of exhaust gas through the EGR passage, and the PETA air pump is deactivated at plot 510 to discontinue the flow of secondary air through the secondary air injection passage. As such, the flow of exhaust gas and the flow of secondary air through the dual heat exchanger are also discontinued, as represented by the plot 508 and the plot 512, respectively. Therefore, as shown in the timing diagram 500, since the temperature of the mixture of exhaust gas and secondary air is maintained above the threshold temperature for HC oxidation (at plot 562 over the duration from time t2 to time t6), the hydrocarbon flow rate at plot 566 remains low throughout the engine cold start.

Referring to FIG. 6, FIG. 6 is a diagram 600 showing example operating parameters during an engine cold start. The operating parameters depicted in diagram 600 include emission control device temperature (illustrated by curve 602), PETA flow control valve position (illustrated by curve 604), EGR valve position (illustrated by curve 606), and air-fuel ratio (illustrated by curve 608). For each operating parameter depicted, time is illustrated on the horizontal axis, and the values of each respective operating parameter are depicted on the vertical axis. The time duration depicted in diagram 600 begins at the engine start and ends at a time after the engine and emission control device have reached operating temperature.

The emission control device illustrated by curve 602 starts with a relatively low temperature, as the engine and exhaust components are at ambient temperature upon start-up of the engine. Following time T1, the device temperature starts to increase, due in part to the heating of the exhaust gas as the engine warms up and in part to the exothermic reaction occurring due to the injection of oxygen-rich secondary air upstream of the emission control device. After time T2, the device has reached its operating temperature.

The position of the PETA flow control valve, depicted by curve 604, is in its default, closed position prior to time T1. However, at time T1, immediately following an exhaust gas blowdown of a cylinder of the engine, the PETA flow control valve opens to inject secondary air into the corresponding exhaust runner as described previously with reference to FIGS. 4 and 5A-5B. The PETA flow control valve is shown to be opened after a threshold amount of time passes since the engine start (e.g., a few seconds), i.e., when the exhaust temperature reaches close to a threshold temperature for HC oxidation as indicated previously with reference to FIG. 5B. The PETA flow control valve may remain opened until the cylinder goes back to the intake stroke of the four stroke cycle and/or until the emission control device reaches operating temperature at time T2.

The EGR valve position, depicted by curve 606, may be in the fully open position immediately following the engine start, to divert exhaust gases to the dual heat exchanger for exchange of heat with secondary air. The EGR valve may remain opened between time T1 and T2, to continue admitting some exhaust gas to the dual heat exchanger. After time T2, the EGR valve may be closed when the emission control device has reached its operating temperature. Thus, EGR valve is fully opened immediately following engine start to preheat PETA air inside dual heat exchanger. However, after time T2, EGR valve position may be fully opened, partially opened or closed based on engine control strategy under hot conditions for NOx emissions reduction and fuel economy.

To produce extra reductants in the exhaust, the engine air-fuel ratio, depicted by curve 608, may be commanded rich after time T1. Prior to time T1 and after time T2, the air-fuel ratio may be maintained near stoichiometry. However, before time T1 and after time T2, the air-fuel ratio may be commanded to a suitable ratio for the given operating conditions. For example, there may be a close-loop control for air fuel ratio through UEGO sensor. Prior to time T1, stoichiometry is maintained to reduce engine out HC emissions. Between time T1 and time T2, the engine may run a certain percentage rich (e.g., 10% more fuel may be injected into cylinder). After time T2, stoichiometry is desired for achieving high conversion efficiency of catalyst under hot conditions.

In this way, HP EGR gas/exhaust gas and PETA air/secondary air are routed through a dual heat exchanger, where the dual heat exchanger cools HP EGR gas and heats PETA air flow. HP EGR gas is routed through EGR cooler to intake passage and PETA air is further heated through an electric heater based upon exhaust temperature sensor input. PETA air is injected in each exhaust runner based upon timing of the exhaust blowdown pulses from the respective cylinders. The increased temperature of PETA air and improved mixture of air and exhaust reduces catalyst lite off time during cold start, and non-heated air during high load conditions reduces exhaust peak temperature which ultimately improves conversion efficiency while mitigating degradation of catalyst.

The disclosure also provides support for a method for a vehicle, comprising: during an engine cold start, heating an emission control device of the engine using a dual heat exchanger to heat secondary air and cool exhaust gas, and further heat the secondary air with an electric heater. In a first example of the method, the method further comprises: immediately following the engine cold start, opening an EGR valve and activating a PETA air pump. In a second example of the method, optionally including the first example, the method further comprises: directing the secondary air to an exhaust runner via an air injector to mix the secondary air with the exhaust gas. In a third example of the method, optionally including one or both of the first and second examples, a flow of the secondary air into the exhaust runner is regulated by a flow control valve coupled to the air injector. In a fourth example of the method, optionally including one or more or each of the first through third examples, the secondary air is injected into the exhaust runner immediately following an exhaust gas blowdown pulse. In a fifth example of the method, optionally including one or more or each of the first through fourth examples, the electric heater heats the secondary air above a threshold temperature for hydrocarbon oxidation. In a sixth example of the method, optionally including one or more or each of the first through fifth examples, an EGR cooler is maintained off during the engine cold-start.

The disclosure also provides support for a system for a vehicle, comprising: an engine having a secondary air injection passage and an EGR passage, a dual heat exchanger coupled to the secondary air injection passage and to the EGR passage, an electric heater coupled to the secondary air injection passage downstream of the dual heat exchanger, and a controller storing instructions in non-transitory memory that, when executed, cause the controller to: responsive to a cold start of the engine, heat an emission control device of the engine using the dual heat exchanger to heat air flowing through the secondary air injection passage and cool exhaust gas flowing through the EGR passage, and further heat the air with the electric heater. In a first example of the system, the dual heat exchanger is positioned between an intake passage and an exhaust passage of the engine, and the dual heat exchanger further comprising: an exhaust inlet port fluidly coupled to the exhaust passage upstream of a turbine via a first part of the EGR passage, an exhaust outlet port fluidly coupled to the intake passage downstream of a compressor via a second part of the EGR passage, a PETA inlet port fluidly coupled to the intake passage downstream of a compressor via a first part of the secondary air injection passage, and a PETA outlet port fluidly coupled to a plurality of exhaust runners via a second part of the secondary air injection passage. In a second example of the system, optionally including the first example, the controller includes further instructions to open an EGR valve positioned in the first part of the EGR passage immediately following an engine start event to allow exhaust gas to flow into the dual heat exchanger. In a third example of the system, optionally including one or both of the first and second examples, the controller includes further instructions to activate a PETA air pump positioned in the first part of the secondary air injection passage immediately following an engine start event to allow the air to flow into the dual heat exchanger. In a fourth example of the system, optionally including one or more or each of the first through third examples, the air flows through a plurality of first passages oriented along a first direction and the exhaust gas flows through a plurality of second passages oriented along a second direction inside the dual heat exchanger for exchange of heat, the first direction being perpendicular to the second direction. In a fifth example of the system, optionally including one or more or each of the first through fourth examples, the controller includes further instructions to direct the air flowing out of the dual heat exchanger to the plurality of exhaust runners via a plurality of air injectors, and wherein a flow control valve coupled to each air injector controls a flow of the air into each exhaust runner.

The disclosure also provides support for a method for an engine, comprising: responsive to a cold start of the engine, opening an EGR valve positioned in an EGR passage to flow exhaust gas through the EGR passage, and activating a PETA air pump positioned in a secondary air injection passage to flow secondary air through the secondary air injection passage; heating the secondary air and cooling the exhaust gas using a dual heat exchanger, the dual heat exchanger being coupled to the EGR passage and the secondary air injection passage downstream of the EGR valve and the PETA air pump; heating the secondary air further with an electric heater coupled to the secondary air injection passage downstream of the dual heat exchanger; and directing the secondary air to a plurality of exhaust runners via a plurality of air injectors to mix the secondary air with the exhaust gas. In a first example of the method, a flow of secondary air into each exhaust runner of the plurality of exhaust runners is regulated by a PETA flow control valve coupled to each air injector of the plurality of air injectors. In a second example of the method, optionally including the first example, the flow of secondary air is injected into each exhaust runner of the plurality of exhaust runners immediately following an exhaust gas blowdown of a corresponding cylinder of the engine. In a third example of the method, optionally including one or both of the first and second examples, the method further comprises: monitoring a temperature of the mixture of exhaust gas and secondary air using a temperature sensor coupled to an exhaust manifold. In a fourth example of the method, optionally including one or more or each of the first through third examples, the electric heater is maintained on as long as the temperature of the mixture of exhaust gas and secondary air inside the exhaust manifold is below a threshold temperature for hydrocarbon oxidation. In a fifth example of the method, optionally including one or more or each of the first through fourth examples, during the engine cold start, the secondary air injected into each exhaust runner exothermically reacts with a reductant in the exhaust gas upstream of an emission control device to heat the emission control device. In a sixth example of the method, optionally including one or more or each of the first through fifth examples, the method further comprises: closing the EGR valve and deactivating the PETA air pump after a temperature of the emission control device reaches a light-off temperature.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle, comprising:
during an engine cold start of an engine,
heating an emission control device coupled downstream of the engine using a dual heat exchanger to simultaneously heat secondary air and cool exhaust gas, and further heating the secondary air with an electric heater, including flowing the secondary air through the dual heat exchanger to the electric heater and from the electric heater to the engine.

2. The method of claim 1, further comprising immediately following the engine cold start, opening an EGR valve and activating a PETA air pump.

3. The method of claim 1, wherein flowing the secondary air through the dual heat exchanger to the electric heater and from the electric heater to the engine further comprises directing the secondary air to an exhaust runner of the engine via an air injector to mix the secondary air with the exhaust gas.

4. The method of claim 3, further comprising regulating flow of the secondary air into the exhaust runner by adjusting a flow control valve coupled to the air injector.

5. The method of claim 4, wherein adjusting the flow control valve comprises opening the flow control valve immediately following an exhaust gas blowdown pulse so that the secondary air is injected into the exhaust runner only immediately following the exhaust gas blowdown pulse.

6. The method of claim 1, wherein the electric heater heats the secondary air above a threshold temperature for hydrocarbon oxidation.

7. The method of claim 1, wherein an EGR cooler is maintained off during the engine cold start.

8. A system for a vehicle, comprising:
an engine having a secondary air injection passage and an EGR passage;
an emission control device coupled to an exhaust passage of the engine;
a dual heat exchanger coupled to the secondary air injection passage and to the EGR passage;
an electric heater coupled to the secondary air injection passage downstream of the dual heat exchanger and upstream of the engine; and
a controller storing instructions in non-transitory memory that, when executed, cause the controller to:
responsive to a cold start of the engine, heat the emission control device using the dual heat exchanger to heat air flowing through the secondary air injection passage and cool exhaust gas flowing through the EGR passage, and further heat the air by activating the electric heater.

9. The system of claim 8, wherein the dual heat exchanger is positioned between an intake passage and the exhaust passage of the engine, and the dual heat exchanger further comprising:
an exhaust inlet port fluidly coupled to the exhaust passage upstream of a turbine via a first part of the EGR passage;
an exhaust outlet port fluidly coupled to the intake passage downstream of a compressor via a second part of the EGR passage;
a PETA inlet port fluidly coupled to the intake passage downstream of the compressor via a first part of the secondary air injection passage; and
a PETA outlet port fluidly coupled to a plurality of exhaust runners of the engine via a second part of the secondary air injection passage.

10. The system of claim 9, wherein the controller includes further instructions to open an EGR valve positioned in the first part of the EGR passage immediately following an engine start event to allow exhaust gas to flow into the dual heat exchanger.

11. The system of claim 10, wherein the controller includes further instructions to activate a PETA air pump positioned in the first part of the secondary air injection passage immediately following the engine start event to allow the air to flow into the dual heat exchanger.

12. The system of claim 9, wherein the air flows through a plurality of first passages oriented along a first direction inside the dual heat exchanger and the exhaust gas flows through a plurality of second passages oriented along a second direction inside the dual heat exchanger for exchange of heat, the first direction being perpendicular to the second direction.

13. The system of claim 12, wherein each exhaust runner includes a respective air injector and wherein the controller includes further instructions to control a flow control valve coupled to each air injector to control a flow of the air into each exhaust runner.

14. A method for an engine, comprising:
responsive to a cold start of the engine, opening an EGR valve positioned in an EGR passage to flow exhaust gas from upstream of a turbine through the EGR passage, and activating a PETA air pump positioned in a secondary air injection passage to flow secondary air from downstream of a compressor through the secondary air injection passage;
simultaneously heating the secondary air and cooling the exhaust gas using a dual heat exchanger, the dual heat exchanger being coupled to the EGR passage and the secondary air injection passage downstream of the EGR valve and the PETA air pump, the dual heat exchanger including a first plurality of passages fluidly coupled to the EGR passage and configured to flow the exhaust gas and a second plurality of passages fluidly coupled to the secondary air injection passage and configured to flow the secondary air, wherein the first plurality of passages and second plurality of passages maintain the exhaust gas in fluidic isolation from the secondary air;
heating the secondary air further with an electric heater coupled to the secondary air injection passage downstream of the dual heat exchanger; and
selectively directing the secondary air from the electric heater to a plurality of exhaust runners via a plurality of air injectors to mix the secondary air with the exhaust gas, including adjusting each of a plurality of flow control valves to selectively direct the secondary air to the plurality of exhaust runners, each respective flow control valve positioned upstream of a respective air injector.

15. The method of claim 14, wherein the flow of secondary air is injected into each exhaust runner of the plurality of exhaust runners immediately following an exhaust gas blowdown of a corresponding cylinder of the engine.

16. The method of claim 14, further comprising monitoring a temperature of the mixture of exhaust gas and secondary air using a temperature sensor coupled to an exhaust manifold.

17. The method of claim 16, wherein the electric heater is maintained on as long as the temperature of the mixture of exhaust gas and secondary air inside the exhaust manifold is below a threshold temperature for hydrocarbon oxidation.

18. The method of claim 14, wherein during the engine cold start, the secondary air injected into each exhaust runner exothermically reacts with a reductant in the exhaust gas upstream of an emission control device to heat the emission control device.

19. The method of claim 18, further comprising closing the EGR valve and deactivating the PETA air pump after a temperature of the emission control device reaches a light-off temperature.

* * * * *